(12) United States Patent
Czompo et al.

(10) Patent No.: US 9,398,536 B2
(45) Date of Patent: Jul. 19, 2016

(54) METHOD AND APPARATUS FOR MOVEMENT DETECTION BY EVALUATING ELEMENTARY MOVEMENT PATTERNS

(75) Inventors: Joseph Czompo, San Jose, CA (US); Cristina A. Seibert, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 12/475,255

(22) Filed: May 29, 2009

(65) Prior Publication Data

US 2010/0304754 A1 Dec. 2, 2010

(51) Int. Cl.
*H04W 24/00* (2009.01)
*H04W 52/02* (2009.01)

(52) U.S. Cl.
CPC ...... *H04W 52/0254* (2013.01); *H04M 2250/12* (2013.01); *Y02B 60/50* (2013.01)

(58) Field of Classification Search
CPC ..... H04W 64/00; H04W 52/02; G06F 1/1626
USPC ............. 455/456.1, 556.2, 574, 556.1, 456.6
See application file for complete search history.

(56) References Cited

U.S. PATENT DOCUMENTS

| | | | |
|---|---|---|---|
| 5,293,642 A * | 3/1994 | Lo | 455/456.2 |
| 5,953,677 A | 9/1999 | Sato | |
| 5,991,692 A | 11/1999 | Spencer, II et al. | |
| 7,024,228 B2 * | 4/2006 | Komsi et al. | 455/566 |
| 7,633,389 B2 * | 12/2009 | Mantovani et al. | 340/539.3 |
| 7,943,850 B2 * | 5/2011 | Leopold et al. | 174/50 |
| 2003/0169228 A1 * | 9/2003 | Mathiassen et al. | 345/156 |
| 2003/0197597 A1 * | 10/2003 | Bahl et al. | 340/7.58 |
| 2004/0204798 A1 * | 10/2004 | Imada et al. | 701/1 |
| 2004/0259536 A1 * | 12/2004 | Keskar et al. | 455/418 |
| 2005/0136994 A1 * | 6/2005 | Bahl et al. | 455/574 |
| 2006/0019724 A1 * | 1/2006 | Bahl et al. | 455/574 |
| 2006/0119508 A1 * | 6/2006 | Miller | 342/357.17 |
| 2007/0015504 A1 * | 1/2007 | Kusuda et al. | 455/426.2 |
| 2007/0067137 A1 * | 3/2007 | Ohkubo et al. | 702/142 |
| 2007/0085157 A1 | 4/2007 | Fadell et al. | |
| 2008/0058032 A1 | 3/2008 | Yamaji et al. | |
| 2008/0114829 A1 * | 5/2008 | Button et al. | 709/203 |
| 2008/0161072 A1 * | 7/2008 | Lide et al. | 455/574 |

(Continued)

FOREIGN PATENT DOCUMENTS

| | | |
|---|---|---|
| CN | 101578571 A | 11/2009 |
| EP | 1662763 | 5/2006 |

(Continued)

OTHER PUBLICATIONS

International Search Report and Written Opinion—PCT/US2010/036680, International Search Authority—European Patent Office—Sep. 10, 2010.

(Continued)

*Primary Examiner* — Justin Lee
(74) *Attorney, Agent, or Firm* — Shyam K. Parekh; Charles E. Eggers

(57) ABSTRACT

The subject matter disclosed herein relates to a system and method for detecting a movement pattern of a mobile device based at least in part on one or more signals representative of one or more sensor measurements, and for determining whether the movement pattern corresponds to a predefined level of movement of the mobile device.

39 Claims, 6 Drawing Sheets

(56) References Cited

U.S. PATENT DOCUMENTS

| | | | |
|---|---|---|---|
| 2008/0172789 A1* | 7/2008 | Elliot et al. | 5/616 |
| 2008/0234935 A1* | 9/2008 | Wolf et al. | 701/216 |
| 2009/0099820 A1 | 4/2009 | Kaplan | |
| 2009/0303204 A1* | 12/2009 | Nasiri et al. | 345/184 |
| 2010/0081458 A1* | 4/2010 | Sheynblat et al. | 455/456.4 |
| 2010/0095251 A1* | 4/2010 | Dunko | 715/863 |

FOREIGN PATENT DOCUMENTS

| | | |
|---|---|---|
| EP | 2166433 | 3/2010 |
| JP | H09127147 A | 5/1997 |
| JP | H10107718 A | 4/1998 |
| JP | 2003169013 A | 6/2003 |
| JP | 2003204390 A | 7/2003 |
| JP | 2005192206 A | 7/2005 |
| JP | 2008113442 A | 5/2008 |
| JP | 2008117424 A | 5/2008 |
| JP | 2008124652 A | 5/2008 |
| JP | 2008203016 A | 9/2008 |
| JP | 2008288780 A | 11/2008 |
| JP | 4258723 B2 | 4/2009 |
| WO | WO2009008411 | 1/2009 |
| WO | WO-2009062176 A2 | 5/2009 |

OTHER PUBLICATIONS

Taiwan Search Report—TW099117280—TIPO—Feb. 3, 2013.

\* cited by examiner

METHOD AND APPARATUS FOR MOVEMENT DETECTION BY EVALUATING ELEMENTARY MOVEMENT PATTERNS

BACKGROUND

1. Field

The subject matter disclosed herein relates to relates to detection of movement patterns for a handheld device.

2. Information

A wireless device may utilize batteries that can supply power for a finite period of time. If someone brings a wireless device on a vacation and forgets to bring a charger to recharge batteries, for example, such a wireless device may run out of power within a matter of days. This may be an issue for people who need to be available via their wireless devices, such as business travelers. Efficient power consumption for a wireless device may therefore be a critical aspect of a wireless device.

A wireless device may periodically determine its position relative to nearby cell towers. For example, a wireless device, such as a cellular telephone or a Personal Digital Assistant (PDA), for example, may periodically broadcast a wireless signal requesting a response from a cell tower nearby. Upon receipt of a broadcast signal, one or more nearby cell towers may transmit a signal acknowledging receipt of such a broadcast signal. In order to perform such broadcasting and reception of signals, a wireless device may utilize a certain amount of battery power for performing such functions. This process may be problematic if wireless device has a relatively short battery life, as available power may be rapidly consumed.

This process of broadcasting and receiving signals may be useful in the event that such a wireless device is physically moving such that it becomes closer to different cell towers over time as it travels through different sectors or coverage areas. However, in the event that a wireless device remains relatively stationary such as, for example, if a user leaves a wireless device on a nightstand while sleeping for the night, such a wireless device would therefore remain in the same coverage area nearest to the same cell tower. Periodically broadcasting a signal may therefore be unnecessary and wasteful in terms of power consumption in order to determine a closet cell tower.

A determination of whether a mobile device has moved may be also be utilized for other applications, such as detecting a security breach, pet/child/asset tracking, law enforcement, Satellite Positioning System (SPS) duty cycling, or SPS navigation and search aiding.

"Movement detection" refers to detecting a non-negligible change in the center of gravity of an object. This is in contrast to "motion detection," where an object may fidget without changing its center of mass or position/location. Some applications may provide motion detection algorithms. However, such applications fails to solve a movement detection problem because, for example, they may determine that fidgeting users, such as a users holding an object in an unsteady hand, are "moving," even though such users may not actually change their positions. Position location techniques such as based on SPS technology can be used to identify a moving user, by simply examining changes in the estimated location. However, such solutions can be expensive in terms of power and cost, and may also be ineffective in various scenarios such as indoors or in urban canyons.

BRIEF DESCRIPTION OF THE FIGURES

Non-limiting and non-exhaustive features will be described with reference to the following figures, wherein like reference numerals refer to like parts throughout the various figures.

SUMMARY

Figure 1A:
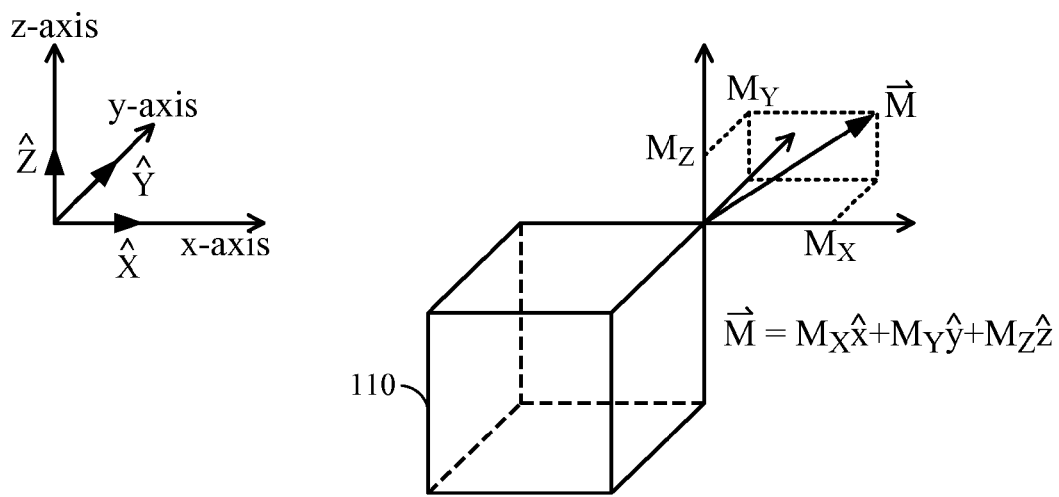
FIG. 1A shows a coordinate system (x, y, z) for representing linear movement with respect to scalar values, a series of scalar values, or time varying functions ($M_X$, $M_Y$, $M_Z$) as measured by an accelerometer according to one aspect.

In one particular implementation, a method is provided in which a movement pattern of a mobile device is detected based at least in part on one or more signals representative of one or more sensor measurements. A determination is subsequently made as to whether such movement pattern corresponds to a predefined level of movement of the mobile device. It should be appreciated, however, that this is merely an example implementation and that other implementations may be employed without deviating from claimed subject matter.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

In order to save power in a mobile device in an Out-Of-Service situation, a search for a nearby cell tower may only be conducted if the mobile device determines that it moved out of the Out-Of-Service area. To detect this movement, accelerometer (and/or potentially gyro) measurements may be used with the assumption that movement can be inferred from these sensor measurements. Such measurements may be used in a way that reliably detects motion even in the presence of disturbing signals picked up by such sensors. Furthermore, such a method may be implemented with passive/low power electronic components.

In one implementation, a system may be adapted to detect one or more elementary sensor "events." An "elementary sensor event" may comprise, for example, a sensor measurement which is larger than a threshold value. For example, an acceleration measurement which exceeds a predetermined or predefined threshold value or a gyroscope measurement exceeding a predetermined threshold value may comprise an elementary sensor event.

"Movement" of a mobile device may be declared if several elementary events occur and form an applicable "movement pattern" during an observation period of time. A "movement pattern" may comprise a movement of a mobile device as observed based on measurements from one or more sensors adapted to detect movement of such a mobile device. For example, a measurement of acceleration and a measurement of rotation observed within a certain time window may comprise a movement patter.

A method of detecting movement may be performed in two parts. In a first part, one or elementary events may be detected by an applicable method, such as via one or more sensor measurements. In a second part, a series of elementary events may be evaluated and a status of (a) "motion" or (b) "stationary" or "no motion" status may be declared. In a first part of such a method, one or more elementary motion events may be generated, for example, by using a 3-dimension accelerometer (and/or potentially gyro) to provide such measurements. If a sensor measurement signal magnitude exceeds a threshold during an elementary event period (e.g., 1.0 sec) on any of the dimensions, an elementary motion event may be declared, for example. Otherwise, an elementary non-motion event may be declared. Such elementary events may be evaluated and if only a few elementary events occur during an observation period, a system might infer that no movement has occurred. Elementary events may be required to occur in sufficient numbers, and possibly with applicable relations to each other to infer movement. In other words, such elementary events may be required to follow a certain predetermined movement pattern.

In one implementation, a portable electronic device, such as a cellular phone or a Personal Digital Assistant (PDA), for example, may include or be in communication with circuitry or other components adapted to detect movement of such a portable electronic device. Such a portable electronic device may be powered by a portable battery that is able to hold a finite amount of charge. Such a battery may be rechargeable. In the event that, for example, a user is travelling, the user may forget to bring a battery charger or may desire to not carry the battery charger with him or her for fear of losing such a battery charger during transport. Moreover, even if a user does have such a battery charger, a situation may arise where there is no electrical wall outlet, for example, available in which to plug such a battery charger. Accordingly, power conservation may useful or desirable for such a portable electronic device.

Some current portable electronic devices periodically perform certain functions, such as broadcasting a signal to determine a nearby base station or cell tower, so that such portable electronic devices can determine which base station or cell tower with which to communicate. In the event that a user is travelling through a coverage area of a cell tower, for example, such a user's portable electronic device may quickly travel from one coverage area for a cell tower to another coverage area for a different cell tower. If, however, such a user is not transporting such a portable electronic device, in other words, such a portable electronic device is essentially stationary, and then periodically broadcasting signals to locate a nearby cell tower may be a wasteful use of available battery power.

According to one implementation, a method and associated system and apparatus are provided for determining whether a portable electronic device has moved. A pattern of movement of a portable electronic device may be detected based upon measurements obtained from one or more sensors. For example, sensor measurements from one or more sensors which exceed a predetermined threshold value may define a pattern of movement. For example, a combination of a measurement of acceleration exceeding a threshold value and a measurement of rotation exceeding a threshold value may define a pattern of movement. Additional examples of patterns of movement may include, for example, a sequence of acceleration peaks during some time interval, or spectral frequency characteristics, such as high incidence of peaks around specific frequencies such as 20 Hz, to name just a couple among many examples.

Such sensors may be contained within such a portable electronic device itself or may instead be in communication with such a portable electronic device—for example, such sensors may be contained within a module which may be coupled to a portable electronic device to detect movement. Such a module may comprise, for example, an electronic device which may be coupled to a portable electronic device. Such sensors may include one or more accelerometers, gyroscopes, barometers, or other applicable types of sensors, such as an altimeter, adapted to provide one or more measurements from which movement may be inferred.

An accelerometer may be used to sense the direction of gravity and any other linear force experienced by the accelerometer. A gyroscope may be utilized to measure a Coriolis effect, heading changes, and rotation. A barometer or a barometric pressure sensor may be utilized to measure atmospheric pressure. An altimeter may be utilized to measure a change in elevation. It should be understood, however, that these are merely examples of sensors that may be used in particular implementations, and claimed subject matter is not limited in this respect.

Measurements from sensors may be utilized to determine whether a portable electronic device has been moved. In one implementation, movement of a portable electronic device may be detected from movement of a center of mass of such a portable electronic device. Such sensors may provide measurements even if a portable electronic device is moving at a constant rate of speed, such as, for example, in an automobile. An accelerometer may detect accelerations due to various vibrations. For example, a chassis of an automobile may vibrate while such an automobile is in motion, and operation of an automobile engine may provide additional vibrations. Other sources of accelerations may include operation of certain systems within an automobile, such as operation of an air conditioner, or unevenness in a road or outside weather, such as wind gusts.

A gyroscope may detect rotations due, for example, to driving on a winding road or unevenness in a road. A barometer or altimeter may detect changes in altitude. A combination of outputs from various sensors may provide a pattern of movement (also referred to herein as a "movement pattern"). Such a pattern of movement may be referred to herein an "elementary event." Upon detection of pattern of movement or elementary event, a determination may be subsequently made as to whether such a pattern of movement corresponds to an actual "movement" of a portable electronic device, or whether such a pattern of movement instead corresponds to a substantially stationary position of such a portable electronic device.

A "movement," as discussed herein, may refer to a physical displacement of an object beyond a threshold amount relative to a point of reference, for example. Such a physical displacement may be determined based upon a movement of a center of mass of such an object. Such an object may comprise, for example, a portable electronic device.

Particulars sensors as described herein may enable different mobile applications depending on which sensors are integrated into a wireless device. Some applications may employ more than one measurement from at least one sensor and may employ multiple degrees (dimensions) of observability from a sensor. Furthermore, a sensor may filter measurements before further processing, described below, occurs.

Some systems merely detect motion of a device based upon measurements obtained from various sensors. Such systems may therefore determine that motion has occurred when, for example, a user is fidgeting while holding a cell phone or is sitting on a stationary park bench and picked up such a cell phone to check a message. One solution declares motion when a signal measured by sensors exceeds a calibrated threshold during a predetermined observation period. A disadvantage of such a method is that it may indicate motion even if a measured signal is incidental when in fact motion did not occur.

A method and system as discussed herein, on the other hand, does more than merely detect motion—instead, movement is detected. There may be some motions which may not be characterized a "movement" of a portable electronic device. For example, a user holding a cell phone with a fidgety/unsteady hand may effectively be imparting some motion, e.g., due to slight accelerations or rotations due to holding such a cell phone in an unsteady hand. In such an example, a movement pattern may be detected but upon evaluation of such a movement pattern, a determination may be made that such a movement pattern does not correspond to a threshold "movement" of such a portable electronic device. Accordingly, an implementation may therefore provide a robust method and system for detecting and evaluating movement and may result in more efficient power consumption as there may not be a need to utilize battery power to broadcast a signal to locate a nearby cell tower in the event that a determination is made that a center of mass of a portable electronic device has remained in a substantially stationary position. In one implementation, incidental movement may be distinguished from a threshold movement based on a movement pattern observed from one or more sensor measurements exceeding predetermined threshold values. An implementation, as discussed herein, may identify patterns in sensor data characteristic of a moving user, and differentiable from a fidgeting user.

As mentioned above, particular implementations may employ accelerometers and gyroscopes ("gyros") to provide 6-dimensions of observability (x, y, z, $\tau$, $\phi$, $\psi$). An accelerometer may sense linear motion (i.e., translation in a plane, such as a horizontal plane). Translation can be measured with reference to at least two dimensions. Such an accelerometer can also offer a measure of an object's tilt (roll or pitch). Thus, with a single 3D accelerometer, an object's motion in Cartesian coordinate space (x, y, z) can be sensed, and the direction of gravity can be sensed to estimate the object's roll ($\tau$) and pitch ($\phi$). Since accelerometers may not be able to easily differentiate between the object's linear motion and tilt, a gyroscope may be used to measure the rotation about (x, y, z) coordinates, that is, roll ($\tau$) and pitch ($\phi$) and yaw ($\psi$), sometime referred to as azimuth or heading.

Linear and angular accelerometers, gyroscopes, and/or one or more barometers may be integrated into a portable electronic device to provide adequate degrees of observability. FIG. 1A shows a coordinate system (x, y, z) for representing linear movement with respect to scalar values, a series of scalar values, or time varying functions ($M_X$, $M_Y$, $M_Z$) as measured by an accelerometer 110. Some accelerometers 110 may provide a magnitude while others may simply provide an indication of movement without a magnitude. An accelerometer 110 may measure linear movement (vector M) along a line with reference to one, two or three linear directions, often referenced with Cartesian coordinates (x, y, z). For example, a one-dimensional accelerometer 110 may provide measurements to indicate linear movement along an x-dimension. A two-dimensional accelerometer 110 may provide measurements to indicate linear movement in a plane along both x-dimension and y-dimension, and a three-dimensional accelerometer 110 may provide measurements to indicate linear movement in 3-dimensional space along x, y and z-dimensions. A three-dimensional accelerometer 110 may comprise a two-dimensional accelerometer combined with a one-dimensional accelerometer, or may comprise three one-dimensional accelerometers. An accelerometer 110 may provide measurements in terms of linear acceleration (in units representing distance per units of time squared; e.g., [m/sec$^2$]), linear velocity (in units representing distance per units of time; e.g., [m/sec]), or linear distance (in units representing distance; e.g., [m]). Linear motion (vector M) may be represented by three values in vector form $M=M_XX+M_YY+M_ZZ$, where ($M_X$, $M_Y$, $M_Z$) are magnitudes, scalar values, a series of scalar values, or time varying functions, and (X, Y, Z) are unit vectors with respect to the origin of a Cartesian coordinate system (x, y, z). In general, an accelerometer as described herein may comprise a sensing means for detecting motion and generating information indicative of linear movement along the one, two or three dimensions of such an accelerometer. Alternatively, a non-Cartesian coordinate system can be used such as a coordinate system aligned with the body frame of the device. In particular implementations, a coordinate system may define dimensions that are mutually orthogonal.

Figure 1B:
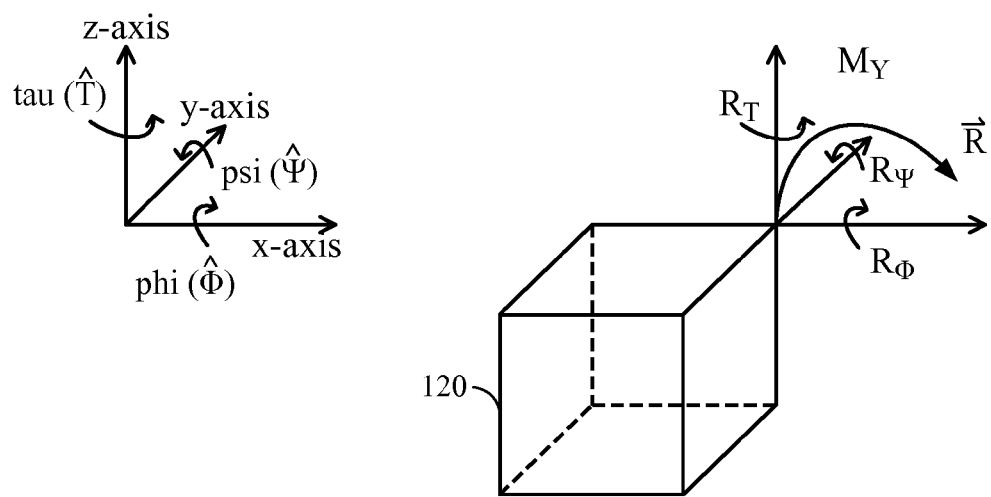
FIG. 1B shows a coordinate system ($\tau$, $\phi$, $\psi$) for representing rotational movement with respect to scalar values, a series of scalar values, or time varying functions ($R_\tau$, $R_\phi$, $R_\psi$) as measured by a gyroscope according to one aspect.

FIG. 1B shows a coordinate system ({fourth root}, $\phi$, $\psi$) for representing rotational movement with respect to scalar values, a series of scalar values, or time varying functions ($R_\tau$, $R_\phi$, $R_\psi$) as measured by a gyroscope 120. Here, gyroscope 120 may measure rotational movement (vector R) about one, two or three dimensions. In one particular implementation, gyroscopic rotation may be measured in terms of coordinates ($\tau$, $\phi$, $\psi$), where tau ($\tau$) represents yaw or rotation about the z-dimension, phi ($\phi$) represents roll or rotation about the x-dimension, and psi ($\psi$) represents pitch or rotation about the y-dimension. In another implementation, gyroscope 120 may comprise a one-dimensional gyroscope to provide measurements indicating rotational movement about a first dimension. In another implementation, a gyroscope 120 may comprise a two-dimensional gyroscope to provide measurements indicating rotational movement about a first dimension and a second dimension. Likewise, in another implementation, gyroscope 120 may comprise a three-dimensional gyroscope to provide measurements indicating rotational movement about first, second and third dimensions. Such a three-dimensional gyroscope may comprise a two-dimensional gyroscope combined with a one-dimensional gyroscope, or may comprise three one-dimensional gyroscopes. Gyroscope 120 may provide measurements in terms of angular acceleration (in units representing change in an angle per unit of time squares; e.g., [rad/sec$^2$]), angular velocity (in units representing change in an angle per unit of time; e.g., [rad/sec]), or an angle (in units representing an angle; e.g., [rad]). Rotational motion (vector R) may be represented by three scalar values, a series of scalar values, or time varying functions in vector from, where $R=R_\tau\tau+R_\phi\phi+R_\psi\psi$, where ($R_\tau$, $R_\phi$, $R_\psi$) are scalar values, a series of scalar values or time varying functions, and where (τ, φ, ψ) are unit vectors in with respect to the rotational coordinate system (τ, φ, ψ). In particular implementations, a gyroscope, as described herein, may comprise a sensing means for detecting motion and producing information indicative of angular movement about one, two or three dimensions of the gyroscope.

A single accelerometer 110 may sense linear movement while a single gyroscope 120 may measure angular movement such as a tilt or roll. Integrating two separate accelerometers 110, two separate gyroscopes 120 or the combination of an accelerometer 110 and a gyroscope 120 into a mobile device may be used to sense linear movement as well as angular movement, for example.

In one example, a three-dimensional accelerometer 110 and a three-dimensional gyroscope (e.g., gyroscope 120) provide six dimensions of observability (x, y, x, τ, φ, ψ). Two three-dimensional accelerometers 110 may also provide six dimensions of observability $(x_1, y_1, x_1, x_2, y_2, x_2)$. A reduced dimensional sensor may be used to sense fewer dimensions of linear and/or rotational motion. For example, a two-dimensional accelerometer 110 and a two-dimensional gyroscope 120 may provide four dimensions of observability (x, y, τ, φ). Techniques described herein may implement a single-sensor or a multi-sensor mobile device measuring one or more dimensions.

Figure 2:
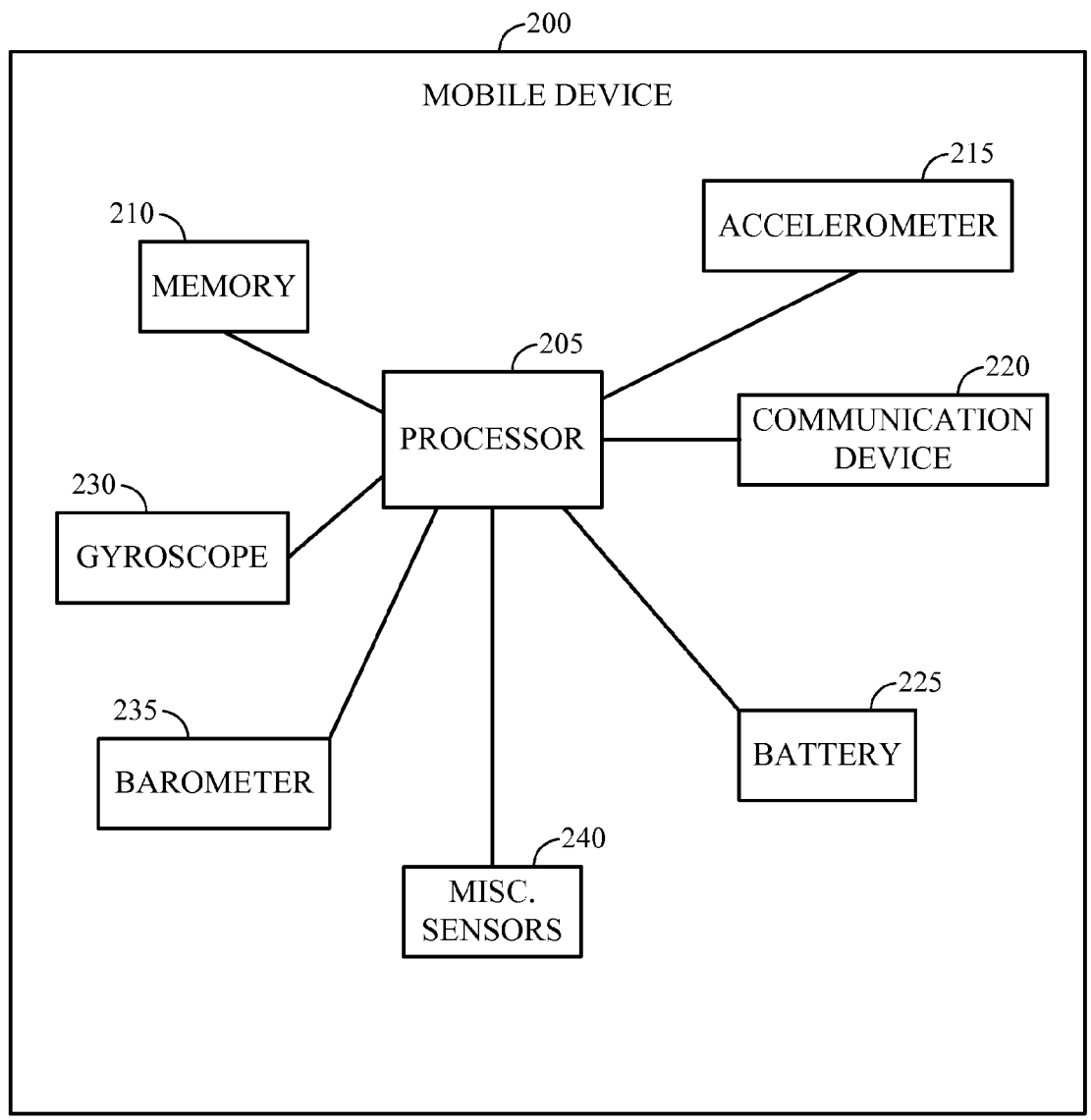
FIG. 2 illustrates a schematic diagram of a mobile device or portable electronic device according to one implementation.

FIG. 2 illustrates a schematic diagram of a mobile device 200 or portable electronic device according to one implementation. Mobile device 200 may include various components/circuitry, such as, for example, a processor 205, memory 210, at least one accelerometer 215, a communication device 220, a battery 225, at least one gyroscope 230, at least one barometer 235, and additional miscellaneous sensors 240. Although battery 225 is shown as only being connected to processor 205, it should be appreciated that battery 225 may supply power to some, or all, of various electronic components of mobile device 200. Memory 210 may contain reference movement patterns against which a detected movement pattern may be compared to determine whether a detected movement pattern corresponds to an actual movement of mobile device 200. Memory 210 may also be utilized to store instructions or code executable by processor 205. As discussed above, accelerometer 215 may detect accelerations of mobile device 200, gyroscope 230 may detect rotations, and barometer 235 may detect changes in altitude. Communication device 220 may be in communication with an antenna (not shown) of mobile device 200 for transmitting and receiving various wireless signals. Mobile device 200 may include miscellaneous sensors 240 to measure additional types of movement. Such miscellaneous sensors 240 may include, for example, a magnetometer and/or a compass.

Figure 3:
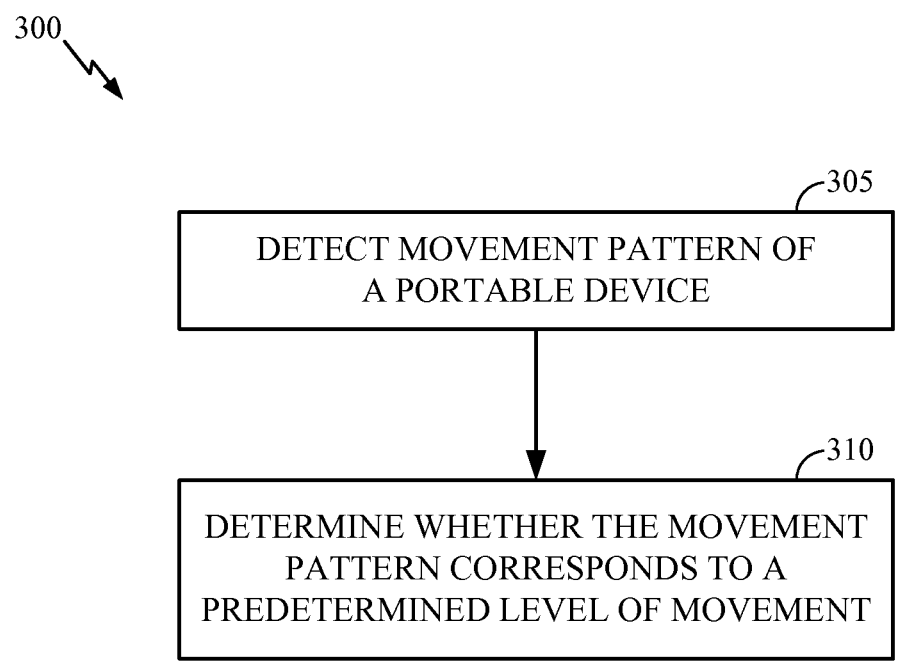
FIG. 3 illustrates a method for determining a movement of a portable device, such as a portable electronic device, according to one implementation.

FIG. 3 illustrates a method 300 for determining a movement of a portable device, such as a portable electronic device, according to one implementation. First, a movement pattern of a portable device is detected at operation 305. As discussed above, such a movement pattern may be determined based on measurements from various sensors which may be housed within a portable device or be coupled to such a portable device. In one implementation, a movement pattern may be determined upon receipt of two or more measurements exceeding predetermined threshold values within a predetermined time window. For example, such measurements may be received from a gyroscope and an accelerometer. Requiring measurements from at least two different sensors may result in more accurate determination of a movement pattern. There may also be a requirement that such measurements be received within a certain time period of each other.

Referring back to FIG. 3, a determination may be made at operation 310 of whether a detected movement pattern corresponds to a predefined or predetermined level of movement. Such a determination may determine whether measurements from sensors indicate a substantial movement of a center of mass beyond a certain threshold, or whether such a center of mass has substantially remained in a stationary position. If a detected movement pattern corresponds to a predetermined level of movement, a determination may be made that the mobile device is in a "movement state." On the other hand, if a detected movement pattern does not correspond to a predetermined level of movement, a determination may be made that the mobile device is in a "stationary state."

Figure 4:
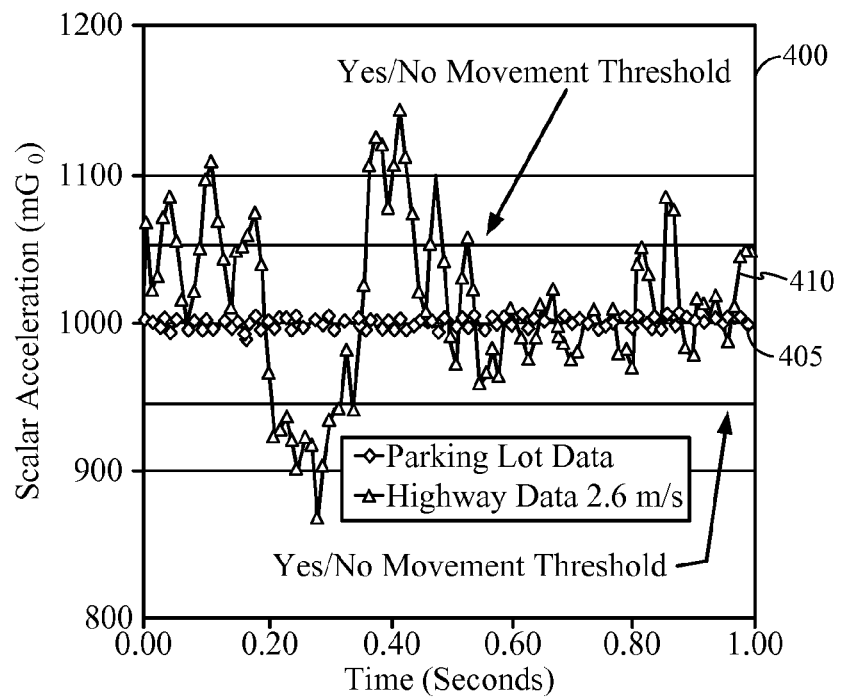
FIG. 4 illustrates an acceleration profile for a stationary mobile device and for a mobile device within an automobile travelling at a constant rate of speed according to one implementation.

In determining whether a movement pattern corresponds to a predetermined level of movement, one or more sensor measurements may be compared against threshold values. FIG. 4 illustrates an acceleration profile 400 for a stationary mobile device and for a mobile device within an automobile travelling at a constant rate of speed according to one implementation. In the event that a mobile device is held in a user's hand, such a user may fidget or hold such a mobile device with an unsteady hand, resulting in small accelerations that may be detected in plot 405. As shown, plot 405 illustrates accelerations of a relatively small magnitude, such as a mobile device held by a user within a stationary automobile in a parking lot. Acceleration profile 400 also illustrates plot 410, which shows acceleration data for a mobile device that is within an automobile travelling at a constant rate of speed.

As shown, a plot 405 for a stationary mobile device differs from a plot 410 for a mobile device moving at a constant rate of speed. Plot 410 shows accelerations of greater magnitude that plot 405. A plot, such as plot 410, for a moving mobile device may tend to exhibit relatively high spikes in acceleration at a relatively high frequency. This may be due not necessarily to a speed of the automobile itself (e.g., a constant speed scenario has no intrinsic acceleration), but instead due to vibrations with such an automobile, such as from an engine or a chassis of the automobile.

A plot for a stationary mobile device, such as plot 405, may exhibit a variety of different acceleration patterns. Such plots for a mobile device that is absolutely still, such as a mobile device sitting on a desk, may show no spikes and an acceleration magnitude around noise.

Acceleration profile 400 may include threshold values, above which a detection of a movement pattern may be determined. In this example, there are thresholds at 900 and 1100 microgravity (mG), i.e., $10^3$*normal gravity.

Figure 5:
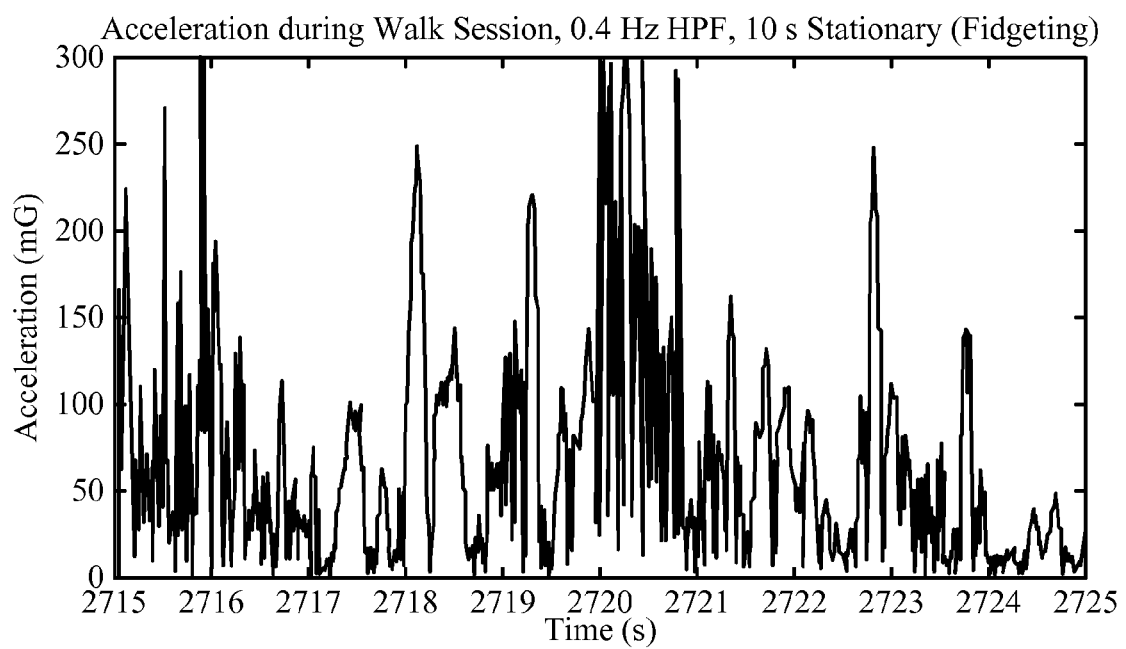
FIG. 5 illustrates an acceleration profile according to one implementation for a stationary user who is fidgeting

FIG. 5 illustrates an acceleration profile 500 according to one implementation for a stationary user who is fidgeting. As shown, various accelerations may be detected, which may be due to a user's unsteady hand when holding a mobile device.

Figure 6:
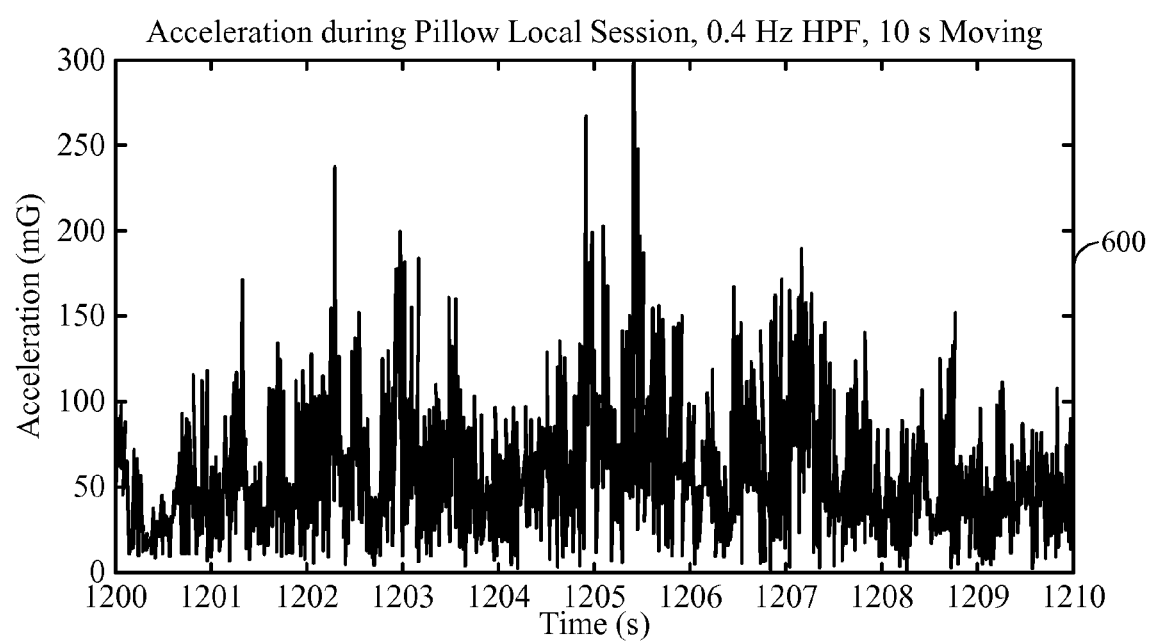
FIG. 6 illustrates an acceleration profile for a mobile device in an automobile moving at a slow rate of speed according to one implementation.
Figure 7:
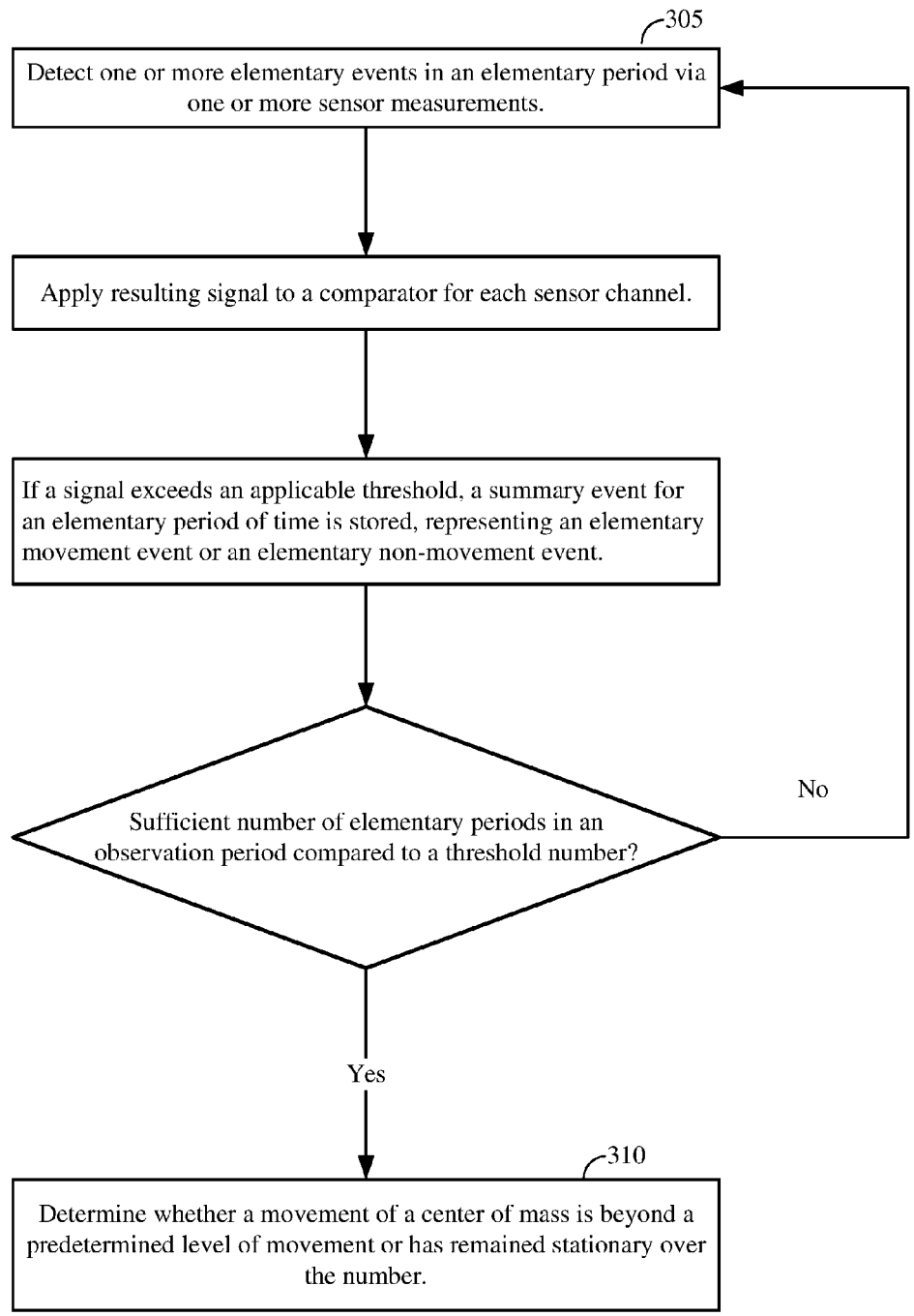
FIG. 7 illustrates details of a method for determining a movement of a portable device, such as a portable electronic device, according to an implementation.

FIG. 6 illustrates an acceleration profile 600 for a mobile device in an automobile moving at a slow rate of speed according to one implementation. As shown, acceleration profile illustrates various acceleration spikes due to vibrations within the automobile.

A mobile device may be able to distinguish, based on respective acceleration profiles, between a stationary mobile device and a moving mobile device. An acceleration profile for a moving mobile device may tend to have acceleration spikes at a higher frequency than those of an acceleration profile for a relatively stationary mobile device. FIGS. 5 and 6 show acceleration data in a time domain. As shown, acceleration spikes rapidly change in FIG. 6, but more slowly change in FIG. 5. The reason for the slower changes in acceleration spikes for acceleration profile 500 of FIG. 5 is due to acceleration spikes at relatively lower frequencies than those of acceleration profile 600 of FIG. 6.

Accordingly, by accounting for frequency of accelerations, accelerations due to a fidgeting user may be distinguished from accelerations due to a moving mobile device.

A method and system has been described herein where transmission and reception of signals may be performed in response to detecting movement of a mobile device. However, it should be appreciated that teachings herein may be applied to other implementations. For example, a determination of whether a mobile device has moved may be utilized for security breach, pet/child/asset tracking, law enforcement, SPS or GPS duty cycling, SPS navigation and search aiding, to name just a few among many possible uses for movement detection Moreover, it should be appreciated that measurements from various sensors may be filtered prior to performing a movement pattern analysis to, for example, account for possible inaccuracies due to noise. Sensors utilized in performing a method as discussed herein may either be digital sensors or analog.

One implementation may utilize passive/low power simple electronic parts. Analog sensor measurements may be high pass filtered to eliminate biases, separately on all three channels for an accelerometer, for example. A resulting signal may be led through a comparator for each sensor channel, which may produce a high logic level if a signal exceeds an applicable threshold. Such three results may be logically OR-ed into one flip-flop that temporarily stores a summary event for an elementary period of time (e.g., 1.0 sec). Elementary events may be clocked into a shift register as ones and zeros and the flip-flop may be cleared. Register length may correspond to an observation period (e.g., 30 sec). Ones may represent an elementary movement, and zero may represent an elementary non-movement event. In a simple form of evaluation, if a number of ones exceed a threshold, movement is declared for an observation period.

Use of a movement detection method as discussed herein may potentially extend battery life of a mobile device by minimizing unnecessary functions such as broadcasting and receiving signals to determine a nearby cell tower even if such a mobile device has remained substantially stationary.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
    detecting a predefined movement pattern of a mobile device during an observation period that comprises a plurality of elementary periods of time, based at least in part on:
        results which are representative of sensor measurements obtained in an elementary period of time from two or more sensors in the mobile device, each result being determined by a comparator for a sensor measurement of each sensor to exceed or not exceed a predetermined first threshold applicable thereon, the results evaluating to a summary event for the elementary period indicative of a status of motion of the mobile device or no motion of the mobile device in the elementary period, and
        a number of elementary periods of time in the observation period, in which the results of comparing the sensor measurements in each elementary period evaluate to the summary event for the elementary period indicative of the status of motion of the mobile device, being sufficient in said number to exceed a second threshold on said number; and
    determining whether the predefined movement pattern corresponds to a substantially stationary position of the mobile device or to a physical displacement of the mobile device, determined based on a movement of a center of mass of the mobile device beyond a third threshold on distance, within a time interval.

2. The method of claim 1, further comprising determining whether the mobile device is in a movement state or in a stationary state based on the determining whether the predefined movement pattern corresponds to the movement of the center of mass of the mobile device beyond the distance of the third threshold within the time interval.

3. The method of claim 2, further comprising transitioning the mobile device to a low power state in response to determining that the mobile device is in a stationary state.

4. The method of claim 2, further comprising transitioning the mobile device to a high power state in response to determining the mobile device is in a movement state.

5. The method of claim 4, further comprising transmitting a signal to one or more nearby cell towers in response to transitioning the mobile device to the high power state.

6. The method of claim 1, wherein the determining whether the movement pattern corresponds to the movement of the center of mass of the mobile device beyond the distance of the third threshold comprises filtering one or more signals corresponding to low frequency movements.

7. The method of claim 1, wherein the sensor measurements are obtained from two or more sensors and a specific first threshold that is exceeded in the respective elementary periods corresponds to a specific sensor.

8. The method of claim 7, wherein the two or more sensors comprises at least two of an accelerometer, a gyroscope, and a barometer.

9. The method of claim 1, wherein the mobile device comprises a cellular phone or a Personal Digital Assistant (PDA).

10. The method of claim 1, wherein the predefined movement pattern comprises at least a threshold level of linear and angular movement of the mobile device.

11. The method of claim 1 wherein:
the sensor measurements in the elementary time periods that exceed one or more thresholds are from an accelerometer.

12. The method of claim 1 wherein:
signals represent the elementary events which are representative of sensor measurements obtained in the elementary period; and
the signals are logically operated on, to obtain a signal representing the summary event for the elementary period.

13. An apparatus comprising:
means for detecting a predefined movement pattern of a mobile device during an observation period that comprises a plurality of elementary periods of time, based at least in part on:
results which are representative of sensor measurements obtained in an elementary period of time from two or more sensors in the mobile device, each result being determined by a comparator for a sensor measurement of each sensor to exceed or not exceed a predetermined first threshold applicable thereon, the results evaluating to a summary event for the elementary period indicative of a status of motion of the mobile device or no motion of the mobile device in the elementary period, and
a number of elementary periods of time in the observation period, in which the sensor measurements in each elementary period evaluate to the summary event for the elementary period indicative of the status of motion of the mobile device, being sufficient in said number to exceed a second threshold on said number; and
means for determining whether the predefined movement pattern corresponds to a substantially stationary position of the mobile device or to a physical displacement of the mobile device, determined based upon a movement of a center of mass of the mobile device beyond a third threshold on distance, within a time interval.

14. The apparatus of claim 13, further comprising means for generating signals indicative of the results.

15. The apparatus of claim 14, wherein the means for generating signals comprises at least one of an accelerometer means, a gyroscope means, and a barometer means.

16. The apparatus of claim 13, further comprising means for determining whether the mobile device is in a movement state or in a stationary state based on a determination of whether the predefined movement pattern corresponds to the movement of the center of mass of the mobile device beyond the third threshold on distance, within the time interval.

17. The apparatus of claim 16, further comprising means for transitioning the mobile device to a low power state in response to determining that the mobile device is in a stationary state, or for transitioning the mobile device to a high power state in response to determining that the mobile device is in a movement state.

18. The apparatus of claim 13 wherein:
the sensor measurements in the elementary time periods that exceed one or more thresholds are from an accelerometer.

19. A system comprising:
one or more sensors; and
a mobile device comprising a special purpose apparatus to:
detect a predefined movement pattern of the mobile device during an observation period that comprises a plurality of elementary periods of time, based at least in part on:
results which are representative of sensor measurements obtained in an elementary period of time from two or more sensors in the mobile device, each result being determined by a comparator for a sensor measurement of each sensor to exceed or not exceed a predetermined first threshold applicable thereon, the results evaluating to a summary event for the elementary period indicative of a status of motion of the mobile device or no motion of the mobile device in the elementary period, and
a number of elementary periods of time in the observation period, in which the sensor measurements in each elementary period evaluate to the summary event for the elementary period indicative of the status of motion of the mobile device, being sufficient in said number to exceed a second threshold on said number; and
determine whether the movement pattern corresponds to a substantially stationary position of the mobile device or to a physical displacement of the mobile device, determined based upon a movement of a center of mass of the mobile device beyond a third threshold on distance, within a time interval.

20. The system of claim 19, wherein the one or more sensors comprise at least one of an accelerometer, a gyroscope, and a barometer.

21. The system of claim 19, wherein the one or more sensors are housed within the mobile device.

22. The system of claim 19, wherein the one or more sensors are disposed outside of the mobile device.

23. The system of claim 19, wherein the special purpose apparatus is further configured to determine whether the mobile device is in a movement state or in a stationary state based at least in part on a determination of whether the predefined movement pattern corresponds to the movement of the center of mass of the mobile device beyond the third threshold on distance, within the time interval.

24. The system of claim 23, wherein the special purpose apparatus is further configured to implement a low power state for the mobile device at least partially in response to determining that the mobile device is in a stationary state.

25. The system of claim 23, wherein the special purpose apparatus is further configured to implement a high power state of the mobile device at least partially in response to determining that the mobile device is in a movement state.

26. The system of claim 19 wherein:
the sensor measurements in the elementary time periods that exceed one or more thresholds are from an accelerometer.

27. An article comprising a non-transitory storage medium, the non-transitory storage medium comprising machine-readable instructions stored thereon which are executable by a special purpose apparatus to:
detect a predefined movement pattern of the mobile device during an observation period that comprises a plurality of elementary periods of time, based at least in part on:
results which are representative of sensor measurements obtained in an elementary period of time from two or more sensors in the mobile device, each result being determined by a comparator for a sensor measurement of each sensor to exceed or not exceed a predetermined first threshold applicable thereon, the results evaluating to a summary event for the elementary period indicative of a status of motion of the mobile device or no motion of the mobile device in the elementary period, and
a number of elementary periods of time in the observation period, in which the sensor measurements in each elementary period evaluate to the summary event for the elementary period indicative of the status of motion of the mobile device, being sufficient in said number to exceed a second threshold on said number; and
determine whether the movement pattern corresponds to a substantially stationary position of the mobile device or to a physical displacement of the mobile device, determined based upon a movement of a center of mass of the mobile device beyond a third threshold on distance, within a time interval.

28. The article of claim 27, wherein the instructions are further executable by the special purpose apparatus to determine whether the mobile device is in a movement state or in a stationary state based at least partially on the determining whether the predefined movement pattern corresponds to the movement of the center of mass of the mobile device beyond the third threshold on distance, within the time interval.

29. The article of claim 27, wherein the instructions are further executable by the special purpose apparatus to determine whether the movement pattern corresponds to the movement of the center of mass of the mobile device beyond the threshold distance based, at least in part, on filtering detected low frequency movements from the predefined movement pattern.

30. The article of claim 27, wherein the instructions are further executable by the special purpose apparatus to transition to a low power state of the mobile device at least partially in response to determining that the mobile device is in a stationary state.

31. The article of claim 27, wherein the instructions are further executable by the special purpose apparatus to transition to a high power state of the mobile device at least partially in response to determining that the mobile device is in a movement state.

32. The article of claim 31, wherein the instructions are further executable by the special purpose apparatus to initiate transmission of a signal to one or more nearby cell towers at least partially in response to transitioning to the high power state.

33. The article of claim 27, wherein the instructions are further executable by the special purpose apparatus to obtain one or more signals representative of sensor measurements from a set of sensors.

34. The article of claim 27, wherein the instructions are further executable by the special purpose apparatus to obtain one or more signals representative of sensor measurements within the time interval.

35. The article of claim 27 wherein:
the sensor measurements in the elementary time periods that exceed one or more thresholds are from an accelerometer.

36. A method comprising:
detecting a predefined movement pattern of a mobile device during an observation period that comprises elementary periods of time, based at least in part on a series of elementary events which are representative of sensor measurements in the elementary periods that exceed or do not exceed one or more first thresholds applicable thereon to evaluate to a status of motion or no motion in an elementary period, and elementary periods with the sensor measurements that evaluate to the status of motion being sufficient in number in the observation period to exceed a second threshold on said number; and
determining whether the predefined movement pattern corresponds to a movement of a center of mass of the mobile device beyond a third threshold on distance, within a time interval;
wherein the elementary events are represented by signals clocked as ones and zeros, with a one representing a first elementary event indicative of said status of motion, and a zero representing a second elementary event indicative of a status of no motion.

37. An apparatus comprising:
means for detecting a predefined movement pattern of a mobile device during an observation period that comprises elementary periods of time, based at least in part on a series of elementary events which are representative of sensor measurements in the elementary periods that exceed or do not exceed one or more first thresholds applicable thereon to evaluate to a status of motion or no motion in an elementary period, and elementary periods with the sensor measurements that evaluate to the status of motion being sufficient in number in the observation period to exceed a second threshold on said number; and
means for determining whether the movement pattern corresponds to a predefined level of movement of a center of mass of the mobile device beyond a third threshold on distance, within a time interval;
wherein the elementary events are represented by signals clocked into said register as ones and zeros, with a one representing a first elementary event indicative of said status of motion, and a zero representing a second elementary event indicative of a status of no motion.

38. A system, comprising:
one or more sensors; and
a mobile device comprising a special purpose apparatus to:
detect a predefined movement pattern of the mobile device during an observation period that comprises elementary periods of time, based at least in part on a series of elementary events which are representative of sensor measurements by the one or more sensors in the elementary periods that exceed or do not exceed one or more first thresholds applicable thereon to evaluate to a status of motion or no motion in an elementary period, and elementary periods with the sensor measurements that evaluate to the status of motion being sufficient in number in the observation period to exceed a second threshold on said number; and determine whether the movement pattern corresponds to a movement of a center of mass of the mobile device beyond a third threshold on distance, within a time interval;

wherein the elementary events are represented by signals clocked into said register as ones and zeros, with a one representing a first elementary event indicative of said status of motion, and a zero representing a second elementary event indicative of a status of no motion.

39. An article comprising: a non-transitory storage medium comprising machine-readable instructions stored thereon which are executable by a special purpose apparatus to:

detect a predefined movement pattern of a mobile device during an observation period that comprises elementary periods of time, based at least in part on a series of elementary events which are representative of sensor measurements in the elementary time periods that exceed or do not exceed one or more first thresholds applicable thereon to evaluate to a status of motion or no motion in an elementary period, and elementary periods with the sensor measurement signals that evaluate to the status of motion being sufficient in number in the observation period to exceed a second threshold on said number; and determine whether the predefined movement pattern corresponds to a movement of a center of mass of the mobile device beyond a third threshold on distance, within a time interval;

clock signals representing the elementary events into a register as ones and zeros, with a one representing a first elementary event indicative of said status of motion, and a zero representing a second elementary event indicative of a status of no motion.

* * * * *